(12) United States Patent
Olmo Mora et al.

(10) Patent No.: US 11,745,848 B2
(45) Date of Patent: Sep. 5, 2023

(54) SOUND WAVES ABSORBING LAMINATE COMPOSITE MATERIAL STRUCTURE

(71) Applicant: AIRBUS OPERATIONS S.L., Madrid (ES)

(72) Inventors: Raul Olmo Mora, Madrid (ES); Tamara Blanco Varela, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 345 days.

(21) Appl. No.: 16/999,198

(22) Filed: Aug. 21, 2020

(65) Prior Publication Data

US 2021/0053669 A1 Feb. 25, 2021

(30) Foreign Application Priority Data

Aug. 21, 2019 (EP) ..................... 19382719

(51) Int. Cl.
*B64C 1/40* (2006.01)
*B29C 70/22* (2006.01)
(Continued)

(52) U.S. Cl.
CPC .............. *B64C 1/40* (2013.01); *B29C 70/228* (2013.01); *B32B 5/024* (2013.01); *G10K 11/168* (2013.01); *B29K 2307/04* (2013.01); *B29K 2309/08* (2013.01); *B32B 2250/03* (2013.01); *B32B 2250/05* (2013.01); *B32B 2262/101* (2013.01);
(Continued)

(58) Field of Classification Search
CPC .............. B64C 1/40; B64C 2001/0072; B29C 70/228; B32B 5/024; B32B 2250/03; B32B 2250/05; B32B 2262/101; B32B 2262/106; B32B 2307/102; B32B 2605/18; B32B 2250/20; B32B 2250/42; B32B 2260/023; B32B 2260/046; B32B 2262/0207; B32B 2262/14; B32B 2307/52; B32B 2607/00; B32B 5/08; B32B 5/10; B32B 5/12; B32B 5/26; B32B 7/02; B32B 5/02; B32B 7/08; B32B 7/12; B32B 27/06; B32B 27/12; B32B 33/00; B32B 37/10; B32B 37/12;
(Continued)

(56) References Cited

U.S. PATENT DOCUMENTS

2019/0248106 A1* 8/2019 Plug .................... B32B 5/024

FOREIGN PATENT DOCUMENTS

WO 2008/147754 12/2008
WO 2018/002229 1/2018

OTHER PUBLICATIONS

ACP Composites, Weave Patterns, 2011, obtained from https://commercecontent.azureedge.net/0012-content/Weave-Patterns.pdf (Year: 2011).*

(Continued)

*Primary Examiner* — Brian Handville
(74) *Attorney, Agent, or Firm* — Nixon & Vanderhye P.C.

(57) ABSTRACT

A sound wave absorbing laminate composite material structure for an aircraft including stacked plies of a hybrid composite material, wherein each of the hybrid composite material plies includes first polymer material tows parallel to a warp direction, second polymer material tows parallel to a weft direction, and sound absorbent material tows parallel to the warp direction, wherein the first and second polymer material tows carbon or glass fiber reinforcing polymer.

13 Claims, 5 Drawing Sheets

(51) Int. Cl.
  *B32B 5/02* (2006.01)
  *G10K 11/168* (2006.01)
  *B29K 307/04* (2006.01)
  *B29K 309/08* (2006.01)
  *B64C 1/00* (2006.01)

(52) U.S. Cl.
  CPC ... *B32B 2262/106* (2013.01); *B32B 2307/102* (2013.01); *B32B 2605/18* (2013.01); *B64C 2001/0072* (2013.01)

(58) Field of Classification Search
  CPC .............. G10K 11/168; B29K 2307/04; B29K 2309/08; Y02T 50/40; D03D 1/0064
  See application file for complete search history.

(56) References Cited

OTHER PUBLICATIONS

Extended Search Report for EP19382719, dated Feb. 10, 2020, 7 pages.

\* cited by examiner

SOUND WAVES ABSORBING LAMINATE COMPOSITE MATERIAL STRUCTURE

RELATED APPLICATION

This application claims priority to European Patent Application 19382719.3 filed Aug. 21, 2019, the entirety of which is incorporated by reference.

TECHNICAL FIELD

The present invention belongs to the field of aircraft structures and the materials of these aircraft structures, more particularly, to the field of noise absorbing materials for aircraft structures.

BACKGROUND

Conventional structural parts of an aircraft often include carbon fiber reinforcing polymer (CFRP) structures. These CFRP structures typically do not adequately absorb noise coming, for example, from an engine of the aircraft. It is common for sound absorbent material structures to be mounted to CFRP structures at key points to achieve noise reduction.

It has been proposed to integrate sound absorbent materials into CFRP structures based on a continue ply of elastomeric material bonded to carbon ply by means of adhesive joint. This proposal reduces the structural strength of CFRP structures due to the lack of shear load transfer, and also due to strain incompatibility on materials.

SUMMARY

There is a long felt need to reduce noise in aircraft structures, such as a passenger cabin and cockpit, without significantly adversely affecting the structure efficiency (weight/strength) of the structure.

An invention has been made and is disclosed herein for integrating sound absorbent materials into CFRP structures. The invention may be embodied as a laminate composite material structure for an aircraft structure which absorbs sound wave.

In a first inventive aspect, the invention may be embodied to provide a sound wave absorbing laminate composite material structure for an aircraft structure. The laminate composite material structure may include at least three stacked plies of a hybrid composite material. Each hybrid composite material ply includes: a plurality of first polymer material tows parallel to a warp direction, wherein each first polymer material tow has a first width $W_1$; a plurality of second polymer material tows parallel to a weft direction, wherein each second polymer material tow has a third width $W_3$, and a plurality of sound absorbent material tows parallel to the warp direction, wherein each sound absorbent material tow has a second width $W_2$. The polymer material tows are tows of carbon fiber reinforcing polymer (CFRP) or glass fiber reinforcing polymer (GFRP). The first and second plurality of polymer material tows and the plurality of sound absorbent material tows are intertwined to form a pattern for each hybrid material ply. The resulting laminate composite material structure achieves an improved absorbing level of sound wave specifically at wavelength $\lambda$. The widths of the plies of the laminate composite material complies with the formula (a):

$$\lambda < (2 \times W_2 + W_1). \tag{a}$$

The hybrid composite material may be a combination of materials of different natures, particularly a combination of plastic material and sound absorbent materials. The intertwining of polymer material tows and sound absorbent tows provides a hybrid composite material ply which advantageously increase sound absorption efficiency with low impact on shear load transfer.

The sound wave absorbing laminate composite material structure advantageously transfers efforts to adjacent plies of hybrid composite material and is capable to reduce the noise introduced in aircraft structures i.e. the motor noise and turbulence noise introduces in the aircraft cabin.

The present laminate composite material structure comprises at least three stacked hybrid composite material plies which are the minimum number of plies that the laminate composite material structure needs for absorbing sound without reduction of the mechanical properties of structure.

The polymer materials of the first and second tows maybe plastic material reinforced by carbon fiber (CF) or glass fiber (GF). These tows of polymeric material provides the mechanical properties to the hybrid composite material, and they serve as the main base of the hybrid material.

The laminate composite material structure of the present invention will absorb the noise and transmit the shear efforts in a common structural behavior thanks to the combination of at least three hybrid composite material plies.

The particular distribution of the polymer material tows in both warp and weft direction, as well as the intertwining of the sound absorbent material tows in the warp direction with the polymer material tows, provides a hybrid composite material ply pattern endowed with high sound absorption efficiency. The warp direction is perpendicular to the weft direction.

The present laminate composite material structure advantageously reduces noise impact inside the aircraft without an impact on structure efficiency (weight/strength) and is an integrated material for manufacturing aircraft structures. Further, manufacturing technologies currently used are maintained and thus the impact on production rates and procedures is low.

In a particular embodiment, the laminate composite material structure comprises a plurality of composite material plies of carbon fiber reinforcing polymer (CFRP) or glass fiber reinforcing polymer (GFRP), being interspersed a composite material ply between each two consecutive hybrid composite material plies.

The combination of CFRP or GFRP plies with hybrid composite material plies advantageously provides a laminate composite material structure with a high structural requirement regarding stiffness.

In a particular embodiment, the first width $W_1$ is equal to the third width $W_3$. The equal widths the polymer material tow in the warp direction and the polymer material tow in the weft direction maintains a balance and equilibrium along both directions in the laminate and simplifies the requirements for the raw material supply for the laminate.

In a particular embodiment, the pattern is 2×2 twill weave carbon fiber pattern.

In another particular embodiment, the pattern is a 5 harness carbon fiber pattern.

In a particular embodiment, at least three stacked hybrid material plies are stacked such that the plies are parallel to each other. In the stack, a first hybrid composite material ply is arranged in a first direction, a second hybrid composite material ply is arranged in a second direction, and a third hybrid composite material ply is arranged in a third direction respectively. The second direction forms +45° angle respect to the first direction and the third direction forms −45° angle respect to the first direction.

The stacking of hybrid composite material plies with different angles of orientation forms an acoustic net enhances the sound suppression properties of the laminate composite material.

In an embodiment of the invention, the laminate composite material structure includes a stack of hybrid composite material plies parallel to each other in the stack. The hybrid composite material plies each include first polymer tows and sound absorbing material, e.g. elastomeric material, tows oriented in a warp direction and second polymer material tows oriented in a weft direction of the ply. The hybrid composite material plies are initially oriented in the stack such that the warp directions are parallel for the plies. While in the stack, the hybrid composite material plies are turned such that the warp direction of the second hybrid composite material ply is at an angle of positive (+) 45 degrees with respect to the warp direction of the first hybrid composite material ply and the warp direction of the third hybrid composite material ply forms is at a negative (−) 45 degree angle with respect to the warp direction of the first hybrid composite material ply. That is, the three hybrid composite material plies are all oriented in a same direction when stacked and then the hybrid composite material plies are rotated respect to the others.

In another particular embodiment, the laminate composite material structure comprises, in order of stacking, thirty plies of composite material, a first hybrid composite material ply, a ply of composite material, a second hybrid composite material ply, a ply of composite material, a third hybrid composite material ply, and three plies of composite material, wherein: the first hybrid composite material ply is arranged in a first direction, the second hybrid composite material ply is arranged in a second direction, and the third hybrid composite material ply is arranged in a third direction. The first direction forms +45° respect to the second direction and the third direction forms +135° respect to the second direction. The composite material plies may include carbon fiber reinforcing polymer.

The above laminate composite material structure may be arranged to protects an auxiliary power unit (APU) in an aircraft or to provide aerodynamic closure of a part or an entirety of an aircraft. For structural requirements, e.g. fire requirements, the hybrid composite material plies may be positioned away from the APU and the thirty composite material plies positioned closer to the APU. Further, the three composite material plies improves the manufacturing and assembly tasks of this particular laminate. Advantageously, this configuration of laminate composite material structure provides a kind of acoustic net for increasing the acoustic material specific surface for reducing the wave length of transmitted sound wave.

In a particular embodiment, the sound absorbent material is an insulation material comprising tows of an elastomeric material.

The use of elastomeric material as sound absorbent materials advantageously provides a high absorption of noise on the laminate composite material structure. The intrinsic properties (elasticity) of the elastomer material are useful in absorbing sonic wave.

In a particular embodiment, the sound absorbent material is a reinforced insulation material comprising tows of an elastomeric material and a reinforcement carrier embedded in the elastomeric material. More particularly, the carrier is a mesh of carbon fiber (CF) or glass fiber (GF).

These reinforcement carriers are a mesh of carbon fiber or glass fiber embedded in the elastomeric material during the polymerization process and aims to increase the general rigidity of the material in its two main directions (longitudinal and transversal) to improve the production process and the compatibility of formations between the polymer material tows.

The elastomeric material may include carbon or glass fibers to reinforce the elastomeric material. A reinforcement carrier may be embedded in the elastomeric material to improve the compatibility of deformations in the sound absorbent material.

The rigidity of the reinforced elastomeric material may be approximately the same as the rigidity of the polymer tows to improve the general elastic behavior of the hybrid material. Moreover, increasing the elastic limit of the sound absorbent material (providing the reinforced elastomeric material) to increase the load level necessary to cause the elastomeric material to enter a plastic deformation regime and thus allow higher general levels of effort of the hybrid material.

In a second inventive aspect, the invention provides a method for manufacturing a sound wave absorbing laminate composite material structure. The method includes:

providing at least three plies of hybrid composite material, laminating and/or stacking the at least three hybrid composite material plies, bonding the at least three hybrid composite material plies, and obtaining the laminate composite material;

wherein each hybrid composite material ply is manufactured by the following steps:

providing a plurality of first polymer material tows in a warp direction, providing a plurality of second polymer material tows in a weft direction, each second polymer material tow being intertwined with the plurality of first polymer material tows, and providing a plurality of sound absorbent material tows in the warp direction, each sound absorbent material tow being intertwined with the first and second polymer material tows, wherein in the manufacturing of the hybrid composite material ply, the first polymer material tows and the sound absorbent material tows are respectively prestressed with a first and second stress, and the second polymer material tows are in charge of intertwining with the first polymer material tows and the sound absorbent material tows.

In the particular case wherein the absorbing material is an elastomeric material, this elastomeric material is reinforced embedding carriers of carbon fiber or glass fiber with the elastomeric material to allow providing higher pretensions for the sound absorbent material and facilitating the tissue process of the hybrid material.

In a particular embodiment, for prepreg material, the step of bonding comprises compacting and curing (preferably by means of an autoclave) the stacking. In another particular embodiment, for dry fiber material, the step of bonding comprises consolidating the stacking by means of resin transfer moulding (RTM).

In a particular embodiment, the step of laminating and/or stacking comprises the following steps:

stacking a first hybrid material ply in a first direction, stacking a second hybrid material ply in a second direction forming a +45° angle respect to the first direction, and stacking a second hybrid material ply in a third direction forming a −45° angle respect to the first direction.

The stacking of hybrid composite material plies with different arrangement for each ply provides a kind of acoustic net for increasing the acoustic material specific surface that advantageously reduces the wave length of transmitted sound wave.

In another particular embodiment, the step of laminating and/or stacking comprises the following steps:
stacking a first hybrid material ply in a first direction,
stacking a second hybrid material ply in a second direction, forming +45° angle respect to the first direction, and
stacking a second hybrid material ply in a third direction, wherein the first direction forms +45° angle respect to the second direction and the third direction forms +135° angle respect to the second direction.

In a particular embodiment, the method further comprising providing a plurality of composite material plies of CFRP or GFRP and laminating such plies of CFRP or GFRP in such a way that such plies of CFRP and GFRP are interspersed between the hybrid composite material plies.

In a particular embodiment, the method further comprises stacking thirty composite material plies and three composite material plies according to an embodiment of the sound wave absorbing laminate composite material structure of the first inventive aspect.

In a third inventive aspect, the invention provides an aircraft comprising an aircraft structure made of a sound wave absorbing laminate composite material structure according to any the first inventive aspect.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

Figure 1:
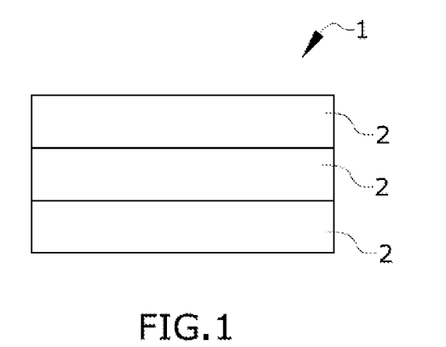
FIG. 1 shows a schematic cross sectional view of the sound wave absorbing laminate composite material structure according to a first embodiment of the present invention.

FIG. 1 shows a cross sectional view of a sound wave absorbing laminate composite material structure (1) for an aircraft structure. The laminate composite material structure (1) comprises three plies of a hybrid composite material (2) according to a first embodiment of the present invention.

Figure 2:
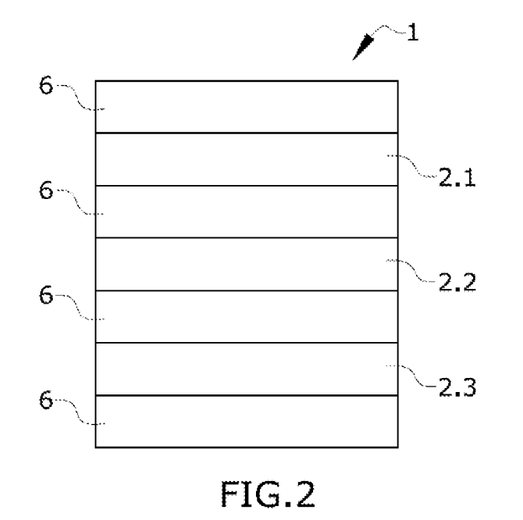
FIG. 2 shows a schematic cross sectional view of the sound wave absorbing laminate composite material structure according to a second embodiment of the present invention.

FIG. 2 shows a cross sectional view of a second embodiment of a sound wave absorbing laminate composite material structure (1) for an aircraft structure. The laminate composite material structure (1) comprises three plies of hybrid composite material (2: 2.1, 2.2, 2.3) and four plies (6) of a carbon fiber reinforcing polymer (CFRP) composite material. The hybrid composite material plies (2) are interspersed between the CFRP plies (6).

In a particular example, the first hybrid composite material ply (2.1) is arranged in a first direction ($d_1$), the second hybrid composite material ply (2.2) is arranged in a second direction ($d_2$), and the third hybrid composite material ply (2.3) is arranged in a third direction ($d_3$) respectively. The second direction ($d_2$) forms +45° angle respect to the first direction ($d_1$) and the third direction ($d_3$) forms −45° angle respect to the first direction ($d_1$).

Figure 3:
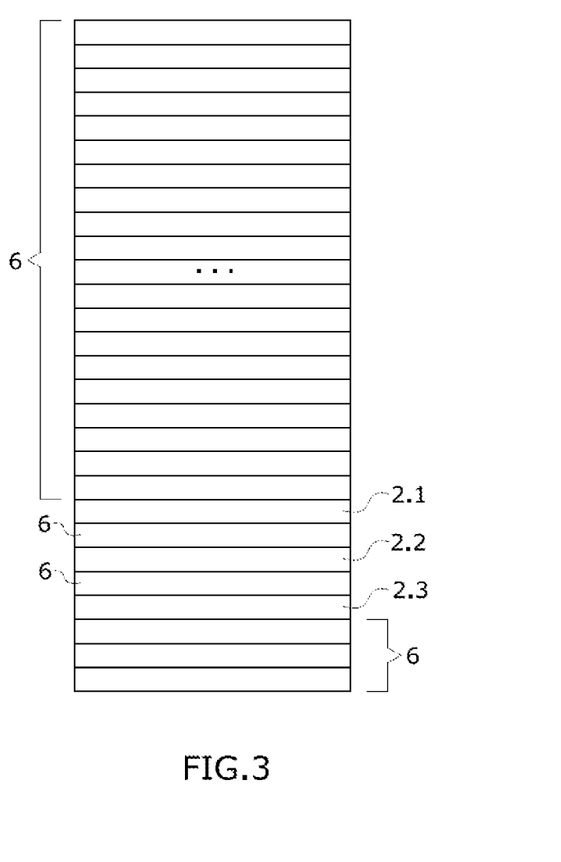
FIG. 3 shows a schematic cross sectional view of the sound wave absorbing laminate composite material structure according to a third embodiment of the present invention.

FIG. 3 shows a cross sectional view of a third embodiment of a sound wave absorbing laminate composite material structure (1) for an aircraft rear structure which protects the auxiliary power unit (APU). The laminate composite material structure (1) comprises from the outside of the aircraft to the inside, thirty plies of composite material (6), a first hybrid composite material ply (2.1), a ply of composite material (6), a second hybrid composite material ply (2.2), a ply of composite material (6), a third hybrid composite material ply (2.3), and three plies of composite material (6). In a particular example, the first hybrid composite material ply (2.1) is arranged in a first direction ($d_1$), the second hybrid composite material ply (2.2) is arranged in a second direction ($d_2$), and the third hybrid composite material ply (2.3) is arranged in a third direction ($d_3$) respectively. The first direction ($d_1$) forms +45° angle respect to the second direction ($d_2$) and the third direction ($d_3$) forms +135° angle respect to the second direction ($d_2$). The composite material plies (6) are preferably carbon fiber reinforcing polymer (CFRP).

Figure 4:
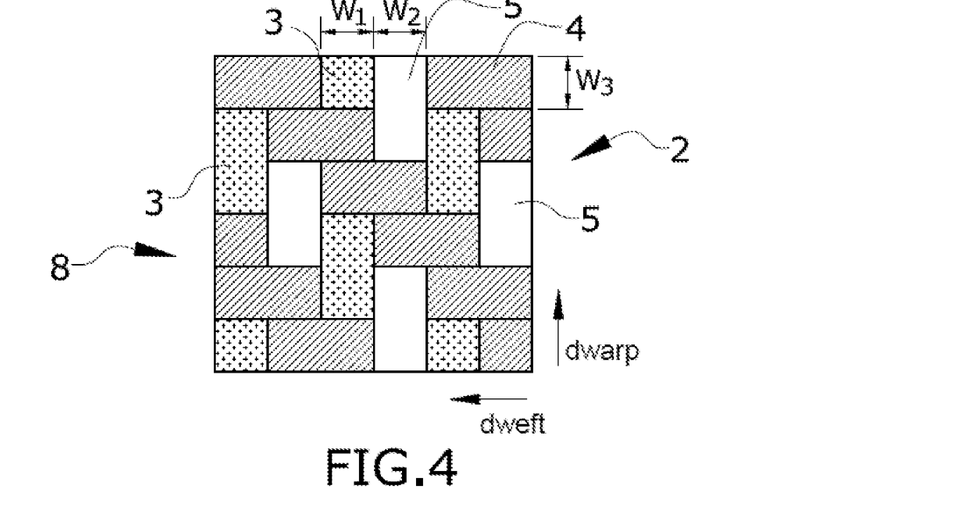
FIG. 4 shows a top view of a hybrid composite material ply of the sound wave absorbing laminate composite material structure according to an embodiment of the present invention.
Figure 5:
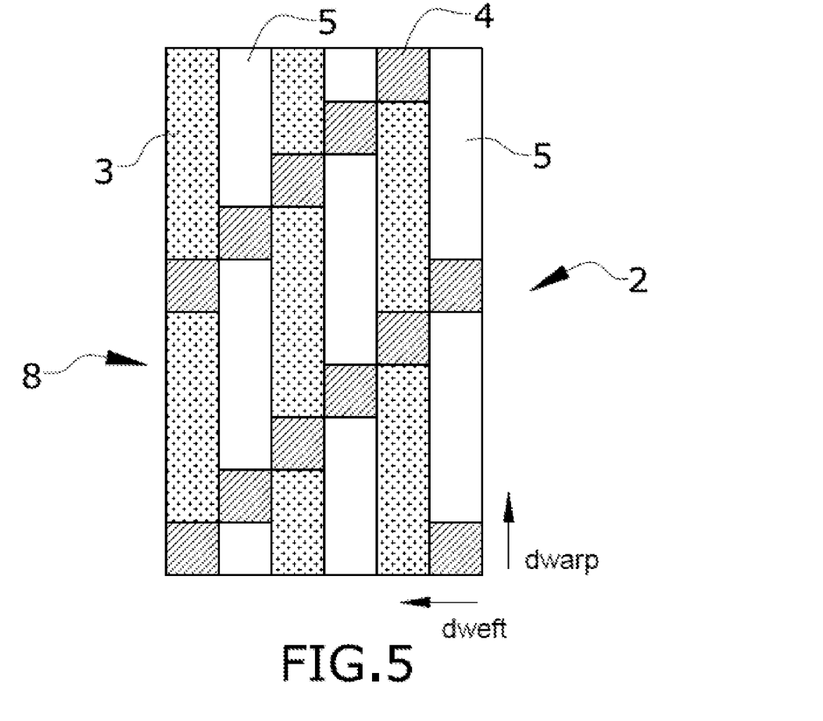
FIG. 5 shows a top view of a hybrid composite material ply of the sound wave absorbing laminate composite material according to an embodiment of the present invention.

FIGS. 4 and 5 show hybrid composite material ply (2) that comprises a plurality of first polymer material tows (3) (identified by dots), a plurality of second polymer material tows (4) (identified by crossed lines), and a plurality of sound absorbent material (5). These polymer material tows (3, 4) are plastic material reinforced by carbon fiber or glass fiber. The sound absorbent material (5) may be an elastomeric material. The first polymer material tows (3) are arranged in a warp direction ($d_{warp}$) and each first polymer material tow (3) comprises a first width $W_1$. The second polymer material tows (4) are arranged in a weft direction ($d_{weft}$) and each second polymer material tow (4) comprises a third width $W_3$. The elastomeric material tows (5) are arranged in the warp direction ($d_{warp}$) parallel to the first polymer material tows and each elastomeric material tow (5) comprises a second width $W_2$. In a particular embodiment, the first width $W_1$ is equal to the third width $W_3$.

A tow is a bundle of fibers generally aligned along a common longitudinal direction. A warp direction is oriented in a lengthwise direction of a ply, and a weft direction is generally perpendicular direction to the warp direction. The weft direction typically extends side-to-side of a ply. Tows are arranged In FIG. 4, the first (3) and second (4) polymer material tows and the elastomeric material tows (5) are intertwined among them forming a 2×2 twill weave carbon fiber pattern (8) as it can be observed. A twill is a type of weave pattern in which the second (4) polymer material tows, which are oriented in the weft direction, are intertwined with the first (3) polymer material tows and the elastomeric material tows (5) which are both oriented in the warp direction. In a 2×2 twill weave each tow (3, 4 5) passes over two tows oriented perpendicular to the two before going under the next twos.

In FIG. 5, the first (3) and second (4) polymer material tows and the elastomeric material tows (5) are intertwined among them forming a 5 harness carbon fiber pattern (8).

The acoustic properties of the present laminate composite material structure (1) depend on the width of tows which form each hybrid composite material ply (2) because wave length attenuated depend on said width. Thus, the present laminate composite material structure (1) is suitable for absorbing wave length ($\lambda$) at different levels of absorption. For a low wave length absorption, the expression ($2 \times W_2 + W_1$) has to be greater than the wave length ($\lambda$). For an average wave length absorption, the first width $W_1$ has to be lower than the wave length ($\lambda$). For a high wave length absorption, the expression ($2 \times W_2 + W_1$) has to be greater than the wave length ($\lambda$) and the wave length has to be also greater than the first width $W_1$.

The present sound wave absorbing laminate composite material structure (1) in addition is capable to transmit shear efforts of the aircraft structure by the tows comprised in each hybrid composite material ply (2).

The present invention additionally provides a method for manufacturing a sound wave absorbing laminate composite material structure (1), the method comprising the following steps:
 providing at least three plies (2) of hybrid composite material,
 stacking the at least three hybrid composite material plies (2),
 bonding the at least three hybrid composite material plies (2), and
 obtaining the laminate composite material (1);
 wherein each hybrid composite material ply (2) is manufactured by the following steps:
 providing a plurality of first polymer material tows (3) in a warp direction ($d_{warp}$),
 providing a plurality of second polymer material tows (4) in a weft direction ($d_{weft}$), each second polymer material tow (4) being intertwined with the plurality of first polymer material tows (3),
 providing a plurality of sound absorbent material tows (5) in the warp direction ($d_{warp}$), each sound absorbent material tow (5) being intertwined with the first (3) and second (4) polymer material tows,
 wherein in the manufacturing of the hybrid composite material ply, the first polymer material tows (3) and the sound absorbent material tows (5) are respectively prestressed with a first and second stress, and the second polymer material tows (4) are in charge of intertwining with the first polymer material tows (3) and the sound absorbent material tows (5).

In the steps of manufacture the hybrid composite material ply (2), firstly the first polymer material tows (3) and sound absorbent material tows (5) are arranged respectively prestressed in a warp direction ($d_{warp}$) with a first and second stress; secondly the second polymer material tows (4) are intertwined with the first polymer material tows (4) and the sound absorbent material tows (5) in a weft direction ($d_{weft}$). In this way, all the tows (3, 4, 5) being intertwined between them.

In a particular embodiment wherein the laminate composite material structure (1) comprises three hybrid composite material plies (2) (as it is shown in FIG. 1 or and 2), the stacking of the hybrid composite material plies (2) is performed by the following steps:
 stacking a first hybrid material ply (2.1) in a first direction ($d_1$),
 stacking a second hybrid material ply (2.2) in a second direction ($d_2$) forming +45° angle respect to the first direction ($d_1$),
 stacking a second hybrid material ply (2.3) in a third direction ($d_3$) forming −45° angle respect to the first direction ($d_1$).

Figure 6:
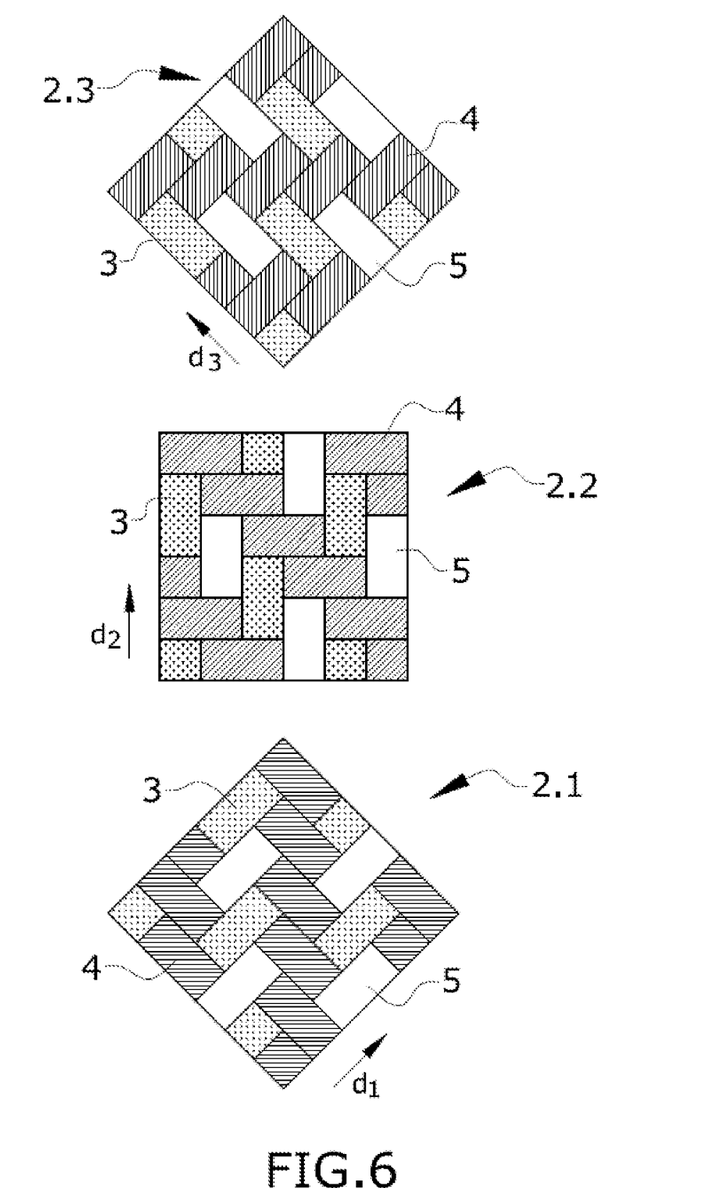
FIG. 6 shows an exploded view of hybrid composite material plies of a sound wave absorbing laminate composite material according to an embodiment of the present invention.

FIG. 6 shows an exploded view of an embodiment of stacking three hybrid composite material plies (2: 2.1, 2.2, 2.3) for a laminate composite material structure (1). In this figure, it can be identified the orientation of each ply (2.1, 2.2, 2.3) according to this particular embodiment. The first hybrid composite material ply (2.1) is oriented in the laminate composite material in a first direction ($d_1$). The second hybrid composite material ply (2.2) is oriented in the laminate composite material in a second direction ($d_2$) which forms +45° angle respect the first direction ($d_1$). The third hybrid composite material ply (2.3) is oriented in the laminate composite material in a third direction ($d_3$) which forms −45° angle respect the first direction ($d_1$).

The three hybrid composite material plies (2.1, 2.2, 2.3) shown in FIG. 6 comprises a patterns according to the example shown in FIG. 4.

Figure 7:
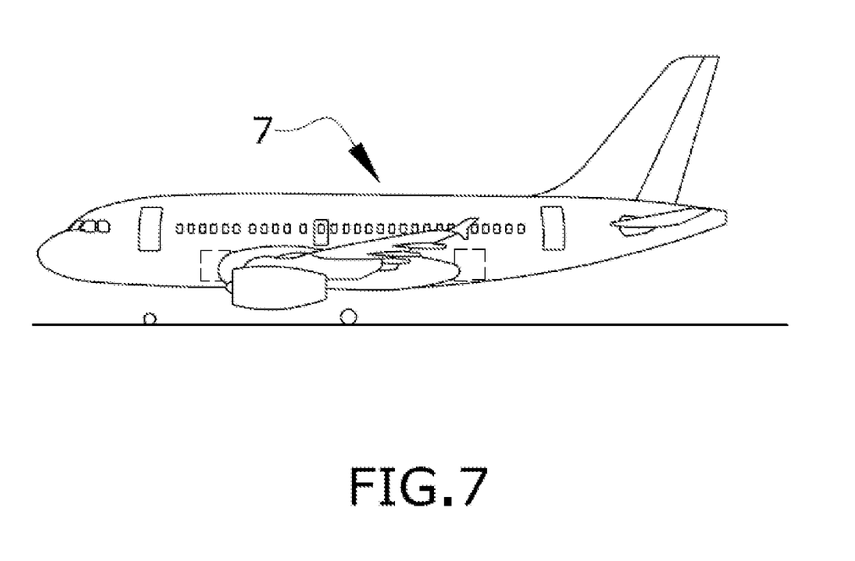
FIG. 7 shows an aircraft according to an embodiment of the present invention.

FIG. 7 shows an aircraft (7) comprising an aircraft structure (not shown) manufactured with a sound wave absorbing laminate composite material structure (1). In a particular embodiment, the aircraft structure is a fan cowl. In another particular embodiment, the aircraft structure is the passenger's cabin. In another particular embodiment, the aircraft structure is a tail cone or a rear section of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sound wave absorbing laminate composite material structure for an aircraft comprising:
 at least three plies of a hybrid composite material, wherein each of the at least three plies of the hybrid composite material includes:
 a plurality of first polymer material tows arranged parallel to a warp direction, wherein each of the first polymer material tows has a first width $W_1$,
 a plurality of second polymer material tows arranged parallel to a weft direction, wherein each of the second polymer material tows has a third width $W_3$,
 a plurality of sound absorbent material tows arranged parallel to the warp direction, wherein each of the sound absorbent material tows has a second width $W_2$,
 wherein the sound absorbent material includes an insulation material comprising tows of an elastomeric material;

the first polymer material tows and the second polymer material tows are tows of carbon fiber reinforcing polymer (CFRP) or glass fiber reinforcing polymer (GFRP); and the plurality of first polymer material tows, the plurality of second polymer material tows, and the plurality of sound absorbent material tows are intertwined in each of the at least three plies of the hybrid composite material; and the first width $W_1$, the second width $W_2$ and the third with $W_3$ conform with a formula which is:

$$\lambda < (2 \times W_2 + W_1),$$

wherein $\lambda$ is a wavelength of a sound wave.

2. The sound wave absorbing laminate composite material structure according to claim 1, further comprising a plurality of composite material plies of carbon fiber reinforcing polymer (CFRP) or glass fiber reinforcing polymer (GFRP), wherein the plurality of composite material plies are sandwiched between a pair of adjacent plies of the at least three plies of the hybrid composite material.

3. The sound wave absorbing laminate composite material structure according to claim 1, wherein the first width $W_1$ is equal to the third width $W_3$.

4. The sound wave absorbing laminate composite material structure according to claim 1, wherein the plurality of first polymer material tows, the plurality of second polymer material tows, and the plurality of sound absorbent material tows are intertwined in a 2×2 twill weave pattern.

5. The sound wave absorbing laminate composite material structure according to claim 1, wherein the plurality of first polymer material tows, the plurality of second polymer material tows, and the plurality of sound absorbent material tows are intertwined in a 5 harness carbon fiber pattern.

6. The sound wave absorbing laminate composite material structure according to claim 1, wherein the at least three plies of hybrid composite material are arranged in a stack and include:
a first hybrid composite material ply in which the plurality of first polymer material tows are oriented in a first direction ($d_1$),
a second hybrid composite material ply in which the plurality of first polymer material tows are oriented in a second direction ($d_2$), and
a third hybrid composite material ply in which the plurality of first polymer material tows are oriented in a third direction ($d_3$),
wherein the second direction ($d_2$) forms +45° angle respect to the first direction ($d_1$) and the third direction ($d_3$) forms −45° angle respect to the first direction ($d_1$).

7. The sound wave absorbing laminate composite material structure according to claim 1, further comprising, in order of stacking on a stack, at least thirty plies of a composite material, a first hybrid composite material ply of the at least three plies of the hybrid composite material, a second hybrid composite material ply of the at least three plies of the hybrid composite material, a further ply of a composite material, and a third hybrid composite material ply of the at least three plies of the hybrid composite material.

8. The sound wave adsorbing laminate composite material of claim 7,
wherein in the first hybrid composite material ply of the plurality of first polymer material tows are oriented in a first direction ($d_1$),
wherein in the second hybrid composite material ply the plurality of the first polymer material tows are oriented in a second direction ($d_2$),
wherein in the third hybrid composite material ply of the plurality of first polymer material tows are oriented in a third direction ($d_3$), and
wherein the first direction ($d_1$) forms +45° angle respect to the second direction ($d_2$) and the third direction ($d_3$) forms +135° angle respect to the second direction ($d_2$).

9. A sound wave absorbing laminate composite material structure for an aircraft comprising:
at least three plies of a hybrid composite material, wherein each of the at least three plies of the hybrid composite material includes:
a plurality of first polymer material tows arranged parallel to a warp direction, wherein each of the first polymer material tows has a first width $W_1$,
a plurality of second polymer material tows arranged parallel to a weft direction, wherein each of the second polymer material tows has a third width $W_3$,
a plurality of sound absorbent material tows arranged parallel to the warp direction, wherein each of the sound absorbent material tows has a second width $W_2$, wherein the plurality of sound absorbent material tows include a reinforced insulation material comprising tows of an elastomeric material and a reinforcement carrier embedded in the tows of the elastomeric material,
the first polymer material tows and the second polymer material tows are tows of carbon fiber reinforcing polymer (CFRP) or glass fiber reinforcing polymer (GFRP); and
the plurality of first polymer material tows, the plurality of second polymer material tows, and the plurality of sound absorbent material tows are intertwined in each of the at least three plies of the hybrid composite material; and
the first width $W_1$, the second width $W_2$ and the third with $W_3$ conform with a formula which is:

$$\lambda < (2 \times W_2 + W_1),$$

wherein $\lambda$ is a wavelength of a sound wave.

10. The sound wave absorbing laminate composite material structure according to claim 9, wherein the reinforcement carrier is a mesh of carbon fiber or glass fiber.

11. A laminate composite material structure comprising:
a stack of plies of a hybrid composite material,
wherein each of the plies of the hybrid composite material includes:
first polymer material tows parallel to a warp direction of the ply, wherein each of the first polymer material tows has a first average width $W_1$,
second polymer material tows arranged parallel to a weft direction of the ply, wherein each of the second polymer material tows has a third average width $W_3$,
sound absorbent material tows arranged parallel to the warp direction, wherein each of the sound absorbent material tows has a second average width $W_2$, wherein the sound absorbent material tows include an elastomeric material,
the first polymer material tows and the second polymer material tows are tows of carbon fiber reinforcing polymer or glass fiber reinforcing polymer;
the first polymer material tows, the second polymer material tows, and the sound absorbent material tows are intertwined in each of the plies of the hybrid material, and the first width $W_1$, the second width $W_2$ and the third with $W_3$ conform with a formula which is:

$$\lambda < (2 \times W_2 + W_1),$$

wherein $\lambda$ is a wavelength of a sound wave.

12. The laminate composite material of claim 11, wherein in a first hybrid composite material ply, of the stack of plies of the hybrid composite material, the plurality of first polymer material tows are oriented in a first direction ($d_1$),
wherein in a second hybrid composite material ply, of the stack of plies of the hybrid composite material, the plurality of first polymer material tows are oriented in a second direction ($d_2$), and
wherein in a third hybrid composite material ply, of the stack of plies of the hybrid composite material, the plurality of first polymer material tows are oriented in a third direction ($d_3$),
wherein the first direction ($d_1$) forms +45° angle respect to the second direction ($d_2$), and the third direction ($d_3$) forms +135° angle respect to the second direction ($d_2$).

13. The laminate composite material of claim 11, wherein the sound absorbent material tows include a reinforcement carrier.

\* \* \* \* \*